US008024119B2

(12) United States Patent
Zeng et al.

(10) Patent No.: US 8,024,119 B2
(45) Date of Patent: Sep. 20, 2011

(54) SYSTEMS AND METHODS FOR GYROCOMPASS ALIGNMENT USING DYNAMICALLY CALIBRATED SENSOR DATA AND AN ITERATED EXTENDED KALMAN FILTER WITHIN A NAVIGATION SYSTEM

(75) Inventors: Yueping Zeng, Dunedin, FL (US); Scott T. Northcutt, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 793 days.

(21) Appl. No.: 11/838,811

(22) Filed: Aug. 14, 2007

(65) Prior Publication Data
US 2009/0048779 A1 Feb. 19, 2009

(51) Int. Cl.
G01C 21/02 (2006.01)
G01S 19/47 (2010.01)
(52) U.S. Cl. .......................... 701/221; 701/216; 702/95
(58) Field of Classification Search .................. 701/216, 701/221; 702/95
See application file for complete search history.

(56) References Cited

U.S. PATENT DOCUMENTS

| 4,783,744 A | * | 11/1988 | Yueh ............................. 701/221 |
| 4,954,837 A | * | 9/1990 | Baird et al. ..................... 342/458 |
| 5,051,751 A | | 9/1991 | Gray |
| 5,075,693 A | * | 12/1991 | McMillan et al. ............. 342/457 |
| 5,101,356 A | * | 3/1992 | Timothy et al. ............... 701/213 |
| 5,184,304 A | | 2/1993 | Huddle |
| 5,272,639 A | * | 12/1993 | McGuffin ...................... 701/207 |
| 5,296,861 A | * | 3/1994 | Knight ...................... 342/357.11 |
| 5,375,059 A | * | 12/1994 | Kyrtsos et al. ................. 701/215 |
| 5,416,712 A | * | 5/1995 | Geier et al. ..................... 701/216 |
| 5,512,904 A | * | 4/1996 | Bennett ..................... 342/357.32 |
| 5,784,029 A | | 7/1998 | Geier |

(Continued)

FOREIGN PATENT DOCUMENTS

| AU | 4159093 | 1/1994 |
| WO | 9612973 | 5/1996 |

OTHER PUBLICATIONS

Yaw Pitch and Roll Rotations. http://planning.cs.uiuc.edu/node102.html. Adapeted from Planning Algorithms, by Steven M. LaValle, Copyright 2006 Cambridge University Press, 842 pages. Website updated Apr. 24, 2010, downloaded Jun. 2, 2010.*

(Continued)

*Primary Examiner* — Mark Hellner
*Assistant Examiner* — Ari M Diaco
(74) *Attorney, Agent, or Firm* — Fogg & Powers LLC

(57) ABSTRACT

A navigation system and method for gyrocompass alignment in a mobile object. The system includes an inertial measurement device configured to provide a first set of sensor data and a positioning unit configured to provide a second set of data. In an example embodiment, the navigation system includes a processing device configured to receive the data sets provided by the inertial measurement device and the positioning device, and the processing device is configured to dynamically calibrate the received first data set the processing device includes a Kalman filter, and the processing device is further configured to generate a gyrocompass alignment using the first dynamically calibrated first data set, the second data set, and the Kalman filter. The method includes receiving sensor data from a plurality of sensors, dynamically calibrating at least a portion of the sensor data, and generating gyrocompass alignment information based on the dynamically calibrated sensor data.

17 Claims, 5 Drawing Sheets

U.S. PATENT DOCUMENTS

| | | | |
|---|---|---|---|
| 5,894,323 A * | 4/1999 | Kain et al. | 348/116 |
| 6,038,498 A | 3/2000 | Briffe et al. | |
| 6,088,653 A | 7/2000 | Sheikh et al. | |
| 6,175,807 B1 * | 1/2001 | Buchler et al. | 701/220 |
| 6,272,480 B1 | 8/2001 | Tresp et al. | |
| 6,298,316 B1 | 10/2001 | Diesel | |
| 6,366,855 B1 * | 4/2002 | Reilly et al. | 701/213 |
| 6,401,036 B1 | 6/2002 | Geier et al. | |
| 6,417,802 B1 * | 7/2002 | Diesel | 342/357.14 |
| 6,433,736 B1 | 8/2002 | Timothy et al. | |
| 6,459,990 B1 * | 10/2002 | McCall et al. | 701/220 |
| 6,535,821 B2 | 3/2003 | Wang et al. | |
| 6,577,952 B2 * | 6/2003 | Geier et al. | 701/214 |
| 6,631,323 B2 | 10/2003 | Tucker et al. | |
| 6,754,584 B2 * | 6/2004 | Pinto et al. | 701/215 |
| 6,826,478 B2 | 11/2004 | Riewe et al. | |
| 6,859,170 B2 | 2/2005 | Devereux et al. | |
| 6,900,760 B2 | 5/2005 | Groves | |
| 7,606,665 B2 * | 10/2009 | Weed et al. | 701/220 |
| 7,643,939 B2 | 1/2010 | Zeng et al. | |
| 7,873,472 B2 | 1/2011 | Zeng et al. | |
| 2002/0165669 A1 * | 11/2002 | Pinto et al. | 701/213 |
| 2003/0216865 A1 | 11/2003 | Riewe et al. | |
| 2005/0010337 A1 * | 1/2005 | Li et al. | 701/13 |
| 2005/0114023 A1 * | 5/2005 | Williamson et al. | 701/214 |
| 2005/0192745 A1 | 9/2005 | Abraham et al. | |
| 2006/0047427 A1 * | 3/2006 | Weed et al. | 701/220 |
| 2007/0156338 A1 | 7/2007 | Jacques et al. | |
| 2007/0282529 A1 * | 12/2007 | Thompson et al. | 701/220 |

OTHER PUBLICATIONS

Determining yaw, pitch, and roll from a rotation matrix. http://planning.cs.uiuc.edu/node103.html. Adapeted from Planning Algorithms, by Steven M. LaValle, Copyright 2006 Cambridge University Press, 842 pages. Website updated Apr. 24, 2010, downloaded Jun. 3, 2010.*

Kalman filter. From Wikipedia, the free encyclopedia. http://en.wikipedia.org/w/index.php?title=Kalman_filter&oldid=58942214 Page revision on 14:01, Jun. 16, 2006. Downloaded Jun. 2, 2010.*

Inertial navigation system. From Wikipedia, the free encyclopedia. http://en.wikipedia.org/w/index.php?title=Inertial_navigation_system&oldid=65836202. Page revision on 21:26, Jul. 25, 2006. Downloaded Jun. 2, 2010.*

Zhengyou Zhang. http://research.microsoft.com/en-us/um/people/zhang/INRIA/Publis/Tutorial-Estim/node16.html. Upolated: Thu Feb 8 11:42:20 MET 1996. Downloaded: Nov. 15, 2010.*

Lerro, D. et al., "Tracking with De-biased Consistent Converted Measurements Versus EKF", "IEEE Transaction/Aerospace & Electronic Systems", 1993, pp. 1015-1022, vol. 29, No. 3.

Levy, "The Kalman Filter: Navigation's Integration Workhorse", "Advanstar Communications", 1997, p. 12 pages, Publisher: John Hopkins University, Applied Physics Laboratory.

Mahendra et al., "Comparison of Nonlinear Filtering Algorithms in Ground Moving Target Indicator (GMTI) Tracking", "Signal and Data Processing of Small Targets", Aug. 2003, pp. 630-647, vol. 5204, Publisher: Proceedings of SPIE, Published in: San Diego, CA.

Sukkarieh, "Low Cost, High Integrity, Aided Inertial Navigation Systems for Autonomous Land Vehicles", "Ph.D. Thesis, Austrialian Centre for Field Robotics", 2000, Publisher: Dept. of Mechanical Engineering, The University of Sydney, Published in: Sydney, Australia.

Van Der Merwe et al., "Efficient Derivative-Free Kalman Filters for Online Learning", "Artificial Neural Networks", Apr. 2001, pp. 205-210, Publisher: European Symposium, Published in: Belgium.

* cited by examiner

SYSTEMS AND METHODS FOR GYROCOMPASS ALIGNMENT USING DYNAMICALLY CALIBRATED SENSOR DATA AND AN ITERATED EXTENDED KALMAN FILTER WITHIN A NAVIGATION SYSTEM

BACKGROUND OF THE INVENTION

Navigation systems are one example of nonlinear dynamic systems. One of the problems associated with navigation system development is the estimation of the various states of the dynamic system. Such estimations typically utilize navigation system software. The extended Kalman filter (EKF) has been used within navigation system software to make such estimations. In some navigation systems, the EKF applies a Taylor series expansion for nonlinear system and observation equations, and utilizes first order terms to apply the well-known linear Kalman filter theory, where the probability density function (PDF) is assumed to be Gaussian.

In practice, however, the EKF has shown several limitations. One of the limitations is that only small errors are allowed to be input into the EKF. Otherwise, in the presence of nonlinear error behavior, the first-order approximations can cause biased solutions and inconsistencies in updating of the covariance matrix, which can lead to filter instability. While second-order versions of the EKF exist, their increased implementation and computation complexity tend to prohibit their use.

A popular technique to improve the first-order approach is the iterated EKF, which effectively iterates the EKF equations at the current time observation by redefining the nominal state estimate and re-linearizing the measurement equations. The iterated EKF is capable of providing better performance than the basic EKF, especially in the case of significant nonlinearity in the measurement function.

Recently, low-cost MEMS-based sensors have become available and affordable for utilization in inertial navigation systems (INS). Such INS applications include airplane navigation, determination of position, and guidance. Most navigation systems contain a GPS range measuring device and an INS which provides data relating to an angular velocity, velocity, and azimuth measuring, which are used in combination to measure motion of a mobile object (e.g., airplane). The navigation systems also contain range error estimating devices. Based on the output of the error estimating devices, position of the mobile object can be determined. The error estimating devices are sometimes implemented using Kalman filters and averaging processes.

The outputs of the various measuring devices are thereby corrected using Kalman filters and the like so that the position of the mobile object can be estimated with a relatively high level of accuracy without using a high precision sensor. However, due to the nature of high noise, nonlinear effects, and imprecise measurements associated with low cost MEMS sensors, traditional EKF estimation will degrade with time and become unreliable. Therefore, the accuracy of the INS is limited, especially when GPS data is not available. Most nonlinear Kalman filters can be used to improve an estimation error, however, such implementations are difficult. More specifically, such implementations are difficult to tune and additionally it is difficult to switch estimation schemes because the nonlinear effect only shows up in certain scenarios.

Current navigation systems that use an inexpensive inertial measurement unit (IMU), such as an IMU based on MEMS devices, also exhibit difficulties in gyrocompass alignment due to a large "turn on" bias and other related errors.

SUMMARY OF THE INVENTION

The present invention includes a navigation system for an aircraft that includes an inertial measurement device configured to provide a first set of sensor data relating to operation of the aircraft and a positioning unit configured to provide a second set of data relating to position of the aircraft. In an example embodiment, the navigation system includes a processing device configured to receive the data sets provided by the inertial measurement device and the positioning device, and the processing device is configured to dynamically calibrate the received first data set, the processing device includes a Kalman filter, and the processing device is further configured to generate a gyrocompass alignment using the first dynamically calibrated first data set, the second data set, and the Kalman filter.

In accordance with further aspects of the invention, the inertial measurement device includes microelectromechanical systems (MEMS) based accelerometers and gyros.

In accordance with other aspects of the invention, the processing device is configured to real-time average the first set of sensor data, the processing device is configured to estimate a heading based on the dynamically calibrated first set of sensor data, and the processing device is configured to generate a gyrocompass alignment using the estimated heading.

In accordance with still further aspects of the invention, the processing device is configured to initialize a conversion matrix using at least a portion of the estimated heading and the processing device is further configured to initialize the Kalman filter using the initialized conversion matrix.

In accordance with yet other aspects of the invention, the processing device is configured to estimate sensor error using the real-time averaged first set of sensor data, and the processing device is further configured to correct the estimated sensor error with known gravitational acceleration and earth rate values to generate the dynamically calibrated first set of sensor data.

In accordance with still other aspects, the invention includes a method for gyrocompass alignment, the method including receiving sensor data from a plurality of sensors, dynamically calibrating at least a portion of the sensor data, and generating gyrocompass alignment information based on the dynamically calibrated sensor data.

In accordance with still further aspects of the invention, the method includes displaying a navigation output based on the generated gyrocompass alignment information.

In accordance with yet other aspects of the invention, the method includes estimating a heading based on the dynamically calibrated sensor data, initializing a conversion matrix using at least a portion of the estimated heading, and initializing an iterated extended Kalman filter using the initialized conversion matrix.

As will be readily appreciated from the foregoing summary, the invention provides a system and method for gyrocompass alignment using dynamically calibrated sensor data.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
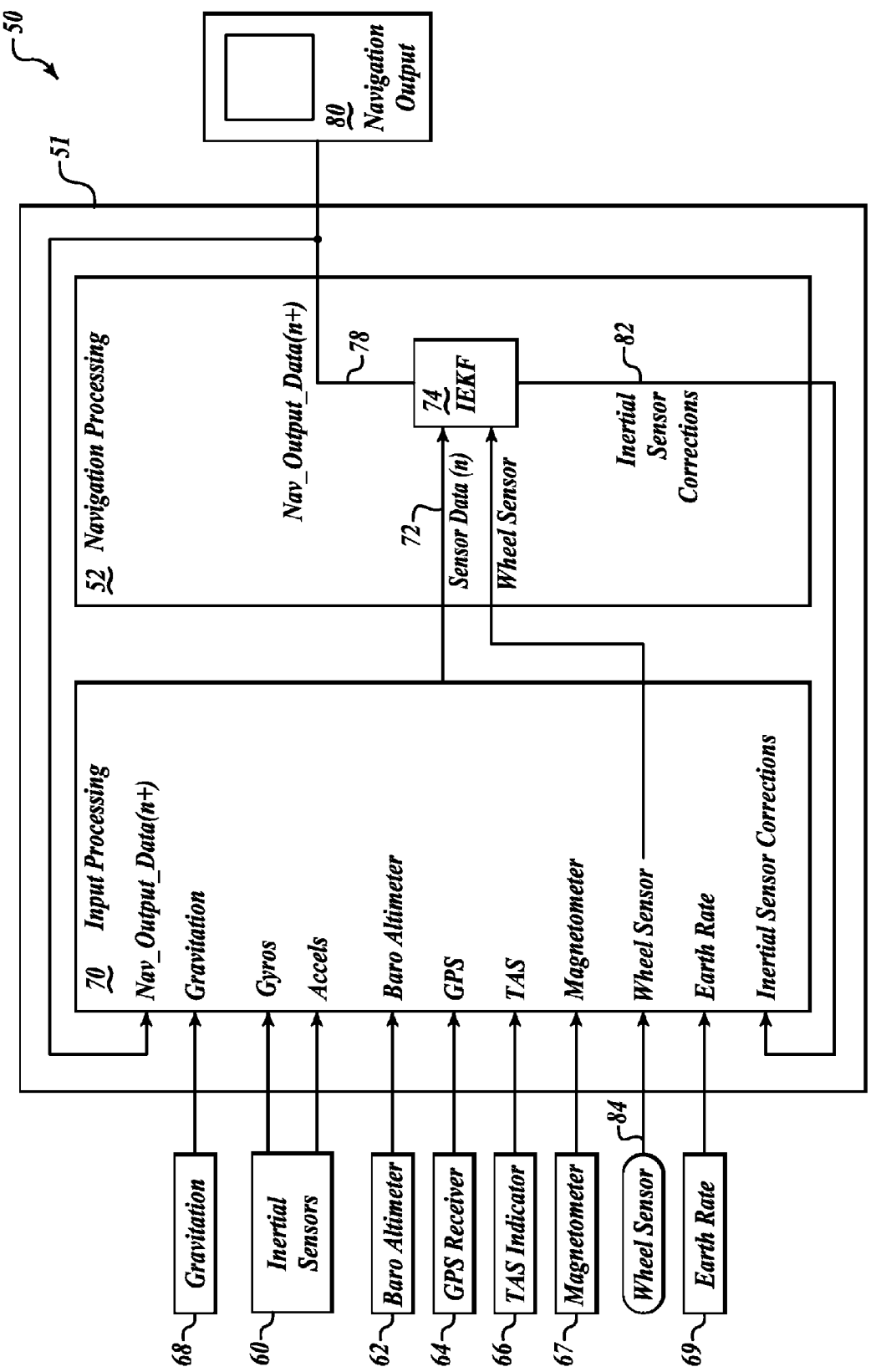
FIG. 1 is a block diagram of a multiple input navigation system incorporating an iterated Kalman filter operable to provide a position solution in a number of operating modes.

FIG. 1 is a block diagram of a navigation system 50 which includes a processing device 51 that includes a navigation processor 52 configured to dynamically switch between Kalman filter implementations in order to at least partially address the problems associated with processing of non-linear errors as described above. The navigation system 50 is used in a mobile object (not shown) such as an aircraft or a spacecraft. In one example, dynamically switching between Kalman filter implementations is utilized to address problems associated with gyroscope compass alignment times. Specific to navigation systems implementations, this dynamic switching provides the navigation processor 52 with a capability to counter non-linear effects in received inertial data when estimating a position and reduce gyroscope compass alignment times for the navigation system 50. In other examples, gyrocompass alignment times are reduced by using dynamic calibration of accelerometer and gyro data, estimation of heading based on the dynamically calibrated data, initialization of a conversion matrix using estimated heading information, and initialization of an iterated extended Kalman filter (IEKF) with the conversion matrix, further described with reference to FIGS. 2-5.

Still referring to FIG. 1, the navigation system 50 includes an inertial measurement device with inertial sensors 60 having, for example, MEMS-based gyroscopes and accelerometers. In one example, the navigation system 50 also includes other sensors such as a barometric altimeter 62, a GPS receiver positioning unit 64, a true airspeed (TAS) indicator 66, and a magnetometer 67. Other types and fewer or greater numbers of sensors may also be included in the navigation system 50 in some examples. The navigation system 50 also includes a gravitation input 68 and an earth rate input 69. The gravitation input 68 is a digitally stored world gravitational map that is accessible by the processing device 51 in one example.

In an example for stationary mode, gyros included in the inertial sensors 60 record components (x, y, and z) of earth-rate and accelerometers included in the inertial sensors 60 record components (x, y, and z) of gravity. In another example, the value of gravity used in the gravitation input 68 is determined using gravitational information associated with a standard reference frame such as the World Geodetic System (WGS), revision WGS 84. The earth-rate is a constant regardless of where the navigation system 50 is located on the surface of the earth. In an example, the earth-rate input 69 and the gravitation input 68 are used for calibration to determine a "bias" or "scale-factor" of the inertial sensors 60. The processing device 51 can then generate compensated sensor data based on information from the inertial sensors 60, the gravitation input 68, and the earth-rate input 69. Components (x, y, and z) of the compensated gyro and accelerometer sensor data are then used by the processing device 51 to generate a heading.

The processing device 51 also includes an input processing unit 70 that processes the data from the listed sensing devices and outputs the combined sensor data 72 to the navigation processor 52. The navigation processor 52 utilizes an iterated, extended Kalman filter (IEKF) 74 to remove errors from the combined sensor data 72 and provide accurate navigational output data 78 to a navigation display device 80 and back into the input processing unit 70. In an example embodiment, the IEKF 74 can selectively operate in a local mode or a global mode. The Kalman filter 74 also provides inertial sensor corrections 82 back into the input processing unit 70. The input processing unit 70 also processes the data from the inertial sensors 60 and outputs a set of combined sensor data 72 to the navigation processor 52. However, in other examples, sensor data is not combined before being output to the navigation processor 52. In an example, navigation processor 52 uses the IEKF 74 in a Global iterated, extended Kalman filter (G-IEKF) mode when gyrocompass alignment is being performed Kalman filter 74 is initialized with at least position and velocity error states, in one embodiment, and incorporates an estimation technique which provides an estimate of navigation system errors. The estimation technique includes a calculation of a Kalman gain matrix which relates an accuracy of a current measurement received from one or more of the sensors 60, 62, 64, 66, and 67 to that of the previous estimates of errors associated with the sensors 60, 62, 64, 66, and 67.

In one embodiment, a wheel sensor signal 84 received by the navigation system 50 is indicative of whether an aircraft (not shown) incorporating the navigation system 50 is on the ground. The wheel sensor signal 84, in the illustrated embodiment, is provided to Kalman filter 74. An indication that the aircraft is on the ground is sometimes referred to as a stationary case, and gyrocompass alignment is typically performed when the aircraft is stationary. In a specific embodiment, the Kalman filter 74 utilizes a state of the wheel sensor signal 84 to switch to and from iteration of both time updating error states and measurement updating error states (a global iterated, extended Kalman filter (G-IEKF) mode) of sensors 60, 62, 64, 66, and 67 and iteration of only the measurement updating error states (an iterated, extended Kalman filter (IEKF) mode) of sensors 60, 62, 64, 66, and 67. While described with respect to the wheel sensor signal 84, other signals and combinations of data from sensors may also be utilized to switch the Kalman filter 74 between iteration of both time updating error states and measurement updating error states of the sensors 60, 62, 64, 66, and 67 and iteration of only the measurement updating error states of the sensors 60, 62, 64, 66, and 67.

As described above, navigation system 50 is a highly accurate, real-time system that incorporates the Kalman filter (IEKF) 74. The IEKF 74, as further described herein, is configured to operate as both a linear basic Kalman filter, performing a single iteration, as well as a nonlinear Kalman filter performing several iterations. The determination between a single iteration and multiple iterations is based upon one or more conditions received, for example, at the input processing unit 70. The determination may also be based upon results from residuals, covariance matrix values, differences between error states, or one or more signals received at the input processing unit 70. During navigation, sensor data received from the sensors 60, 62, 64, 66, and 67 constantly changes, with characteristics that exhibit both linear and non-linear tendencies. The system 50 is configured to dynamically characterize the nonlinear tendencies and adapt the Kalman filter 74 based on the convergence information. In one example, the system 50 is also configured to switch the mode between stationary and non-stationary cases to adapt the Kalman filter 74 between a G-IEKF mode of operation and an IEKF mode of operation.

In an example, the processing device 51 is configured to receive a first set of sensor data from the inertial measurement device sensors 60 and to receive a second set of data from the GPS receiver positioning unit 64. The processing device 51 is configured to dynamically calibrate the first set of sensor data provided by the inertial measurement device sensors 60, such as measurement data received from MEMS based accelerometers and gyros. The processing device 51 is further configured to generate a gyrocompass alignment using the first dynamically calibrated first data set, the second data set, and the IEKF 74.

In an example, the gyro-compass alignment process is performed while a mobile object (not shown) that includes the navigation system 50 is stationary. Heading is located within a range (a few degrees depending on the inertial sensors 60 used) in coarse-alignment mode. Then, fine-mode is used to further refine the accuracy of the heading. The accuracy is determined to within approximately 0.01 degrees with expensive IMUs. DCAL coarse and fine-mode can be used with inexpensive IMUs, such as MEMS based IMUs, in an additional example. The gyro-compass alignment is generally performed in the order of (1) DCAL-coarse mode; (2) IEKF coarse mode; and (3) IEKF fine mode. In an example, DCAL coarse mode includes real-time calibration. In an additional example, DCAL coarse mode also includes reversing a trajectory generation (TGEN) engine or a similar type of engine to find heading information with DCAL aided sensor data. Generally, a TGEN engine is used to generate ideal sensor data according to a target trajectory that includes a stationary case. In another example, heading is located using DCAL coarse mode followed directly by EKF fine mode. In yet another example, heading is located using EKF coarse mode followed by EKF fine mode. The combination of modes used for heading location may vary to suit the needs of differing applications.

In an example, the processing device 51 is configured to real-time average the first set of sensor data, estimate a heading based on the dynamically calibrated first set of sensor data, initialize a body to local conversion matrix using at least a portion of the estimated heading, and initialize the IEKF 74 using the initialized body to local conversion matrix. In an example, body frame is defined in relation to an airplane (not shown) in which the navigation system 50 is included (x-nose, y-wing, z-down) while local frame is defined with local directions (x-north, y-east, z-down). The conversion matrix is initialized using estimated heading information rather than simply averaged accelerometer data. In a further example, the processing device 51 is further configured to estimate sensor error using the real-time averaged first set of sensor data and is further configured to correct the estimated sensor error with the known gravitational acceleration input 68 and earth rate input 69. In an example, the navigation display device 80 is configured to display navigation information using the generated gyrocompass alignment.

By utilizing the Kalman filter 74, the nonlinear effects associated with various error states are reduced and the non-linear Kalman filter 74 can be dynamically turned on or off based on the convergence conditions. Stated differently, Kalman filter 74 within system 50 will adapt and perform iterations as either a Global iterated, extended Kalman filter or as an iterated, extended Kalman filter based on sensor behavior or other signals received by system 50. One such sensor behavior analysis includes a comparison of a current error state vector with a previous error state vector. More specifically, comparing a gyroscope data value and error value from a first and second error state iteration is utilized by the processing device 51 in one embodiment to determine whether and in which mode the Kalman filter 74 will operate. Heading error becomes smaller with multiple iterations of the Kalman filter 74. By comparing values between iterations, the processing device 51 determines if non-linear effects are reduced to predetermined acceptable levels. Such an analysis includes a decision as to whether the sensor behavior is linear or non-linear as a function of error magnitude, and may further include a calibration of the gyroscope nonlinearity with an iteration time of the Kalman filter 74. Such embodiments are thought to improve the accuracy of position determinations made by system 50.

The basic formulas for an iterated, extended Kalman filter are as follows:
Time Update Prediction (Global):
State Estimation Propagation $$\hat{x}_{k|k-1} = F_{k,k-1} \hat{x}_{k-1|k-1} \quad (1)$$

Error Covariance Propagation $$P_{k|k-1} = F_{k,k-1} P_{k-1|k-1} F^T_{k,k-1} + Q_{k,k-1} \quad (2)$$

Measurement Update (Global+Local):
Initialization for State Estimation $$\hat{x}^0_{k|k} = \hat{x}_{k|k-1} \quad (3)$$

State Estimate Update $$\hat{x}^{i+1}_{k|k} = \hat{x}^i_{k|k-1} + K^i_k[z_k - h(\hat{x}^i_{k|k}) - H_k(\hat{x}^i_{k|k})(\hat{x}_{k|k-1} - \hat{x}^i_{k|k})], i=0,1,2,\ldots \quad (4)$$

Kalman Gain Update $$K^i_k = P_{k|k-1} H^T_k(x^i_{k|k})[H_k(x^i_{k|k}) P_{k|k-1} H^T_k(x^i_{k|k}) + R_k]^{-1} \quad (5)$$

Error Covariance Update $$P^{i+1}_{k|k} = P_{k|k-1} - K_k(\hat{x}^i_{k|k}) H_k(\hat{x}^i_{k|k}) P_{k|k-1} \quad (6)$$

In the above, x is the state vector, F is the state transition matrix, P is the covariance matrix, Q is the covariance of dynamic disturbance noise, R is the covariance of measurement noise, H is the measurement sensitivity matrix, and K is the Kalman gain. The index "i" is used for iteration and k is the time related index. As can be determined from equations (1)-(6), for a local iterated, extended Kalman filter implementation, only measurement equations (4)-(6) are updated during iteration.

However, for a global iterated, extended Kalman filter implementation, both time and measurement equations are updated during iteration. Due to the back propagation of the state estimate, a global iterated, extended Kalman filter implementation is utilized, in one embodiment, for gyrocompass alignment. The basic formulas for the global iterated, extended Kalman filter implementation are similar to those of a local extended Kalman filter implementation except that for global iteration both time prediction equations (1)-(2) and measurement equations (4)-(6) are updated. While keeping the time step as "virtual time" during global iteration, the number of measurements can be reduced for a stationary case and the alignment time will be much shorter when compared with that of the traditional extended Kalman filter approach. When convergence is achieved, iteration is stopped.

During iteration, residuals in the measurement equations that are utilized to determine the error states provide direction as to what is needed to reduce the errors. Additionally, a Kalman gain associated with Kalman filter 74 is factored when determining a size of the step to the next error state determinations. Specifically, in one example, Kalman filter 74 reduces gyroscope compass alignment time by iterating both time updating equations and measurement updating equations. Such iterations are substantially equivalent to using a short time step when utilizing a basic extended Kalman filter. Due to noise levels present in the data from various inexpensive sensors, for example, data from micro electromechanical systems (MEMS) based inertial systems, the time step for the extended Kalman filter such as the Kalman filter 74 are usually selected to be approximately 1 second. However, more closely spaced time steps are used in some examples. Such a time step may be used to measure nonlinearity for the sensor data during calibration. In an example, calibration is performed dynamically as is more fully described with reference to FIG. 3.

Another criterion to measure the nonlinearity is the comparison of a current error state vector with a previous error state vector. For example, a first iteration for an iterated, extended Kalman filter is identical with the basic extended Kalman filter. If this first iteration does not cancel the nonlinear effects of the received sensor data, more iterations will be performed by the filter. In one embodiment, and referring back to FIG. 1, real-time navigation system 50 is configured with two rate processors (not shown) to accommodate these iterations. One rate processor is utilized for implementation of the above described Kalman filter and operates at a comparatively slow rate, while the other rate processor is a high rate processor utilized for sensor data updates. Within the Kalman filter implementation, in one embodiment, a for-loop is used to perform the iteration. During iterations, except for the sensor data measurements, other navigation parameters are updated including error state vector and dynamic covariance.

Figure 2:
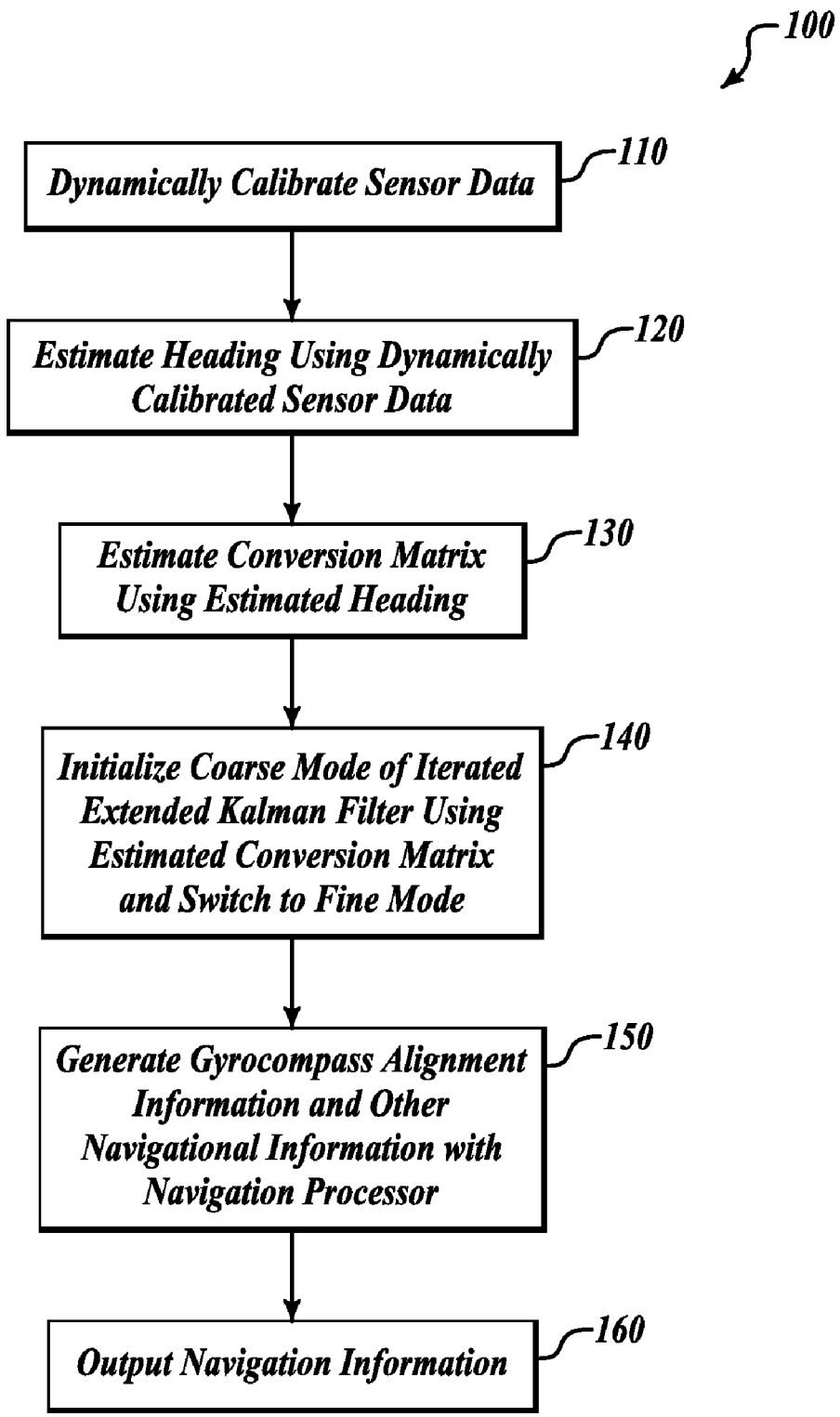
FIGS. 2-5 are flowcharts of a method of generating navigation output in accordance with an embodiment of the invention

FIG. 2 is a flowchart of a method 100 of generating navigation output in accordance with the system 50 shown in FIG. 1. First, at a block 110, dynamic calibration (DCAL) of sensor data is performed in real-time. In one example, this is performed by the input processing unit 70 on gyro and accelerometer data from the inertial measurement device sensors 60. In another example, data from the GPS receiver positioning device 64 is also calibrated. DCAL is described in more detail with reference to FIG. 3. Next, at a block 120, heading is estimated using the calibrated sensor data. Estimation of heading is described in more detail with reference to FIG. 4. Then, at a block 130, a body to local conversion matrix is initialized using the estimated heading. Initialization of the conversion matrix is described in more detail with reference to FIG. 5. Next, at a block 140, a coarse mode of an iterated Kalman filter (IEKF), such as the IEKF 74, is initialized using the body to local conversion matrix and the IEKF 74 is switched to fine mode. Then, at a block 150, navigation processing is performed using the initialized IEKF 74. Next, at a block 160, navigation output is generated based on the navigation processing. In one example, navigation processing is performed by the navigation processor 52 and output to the navigation display device 80.

Figure 3:
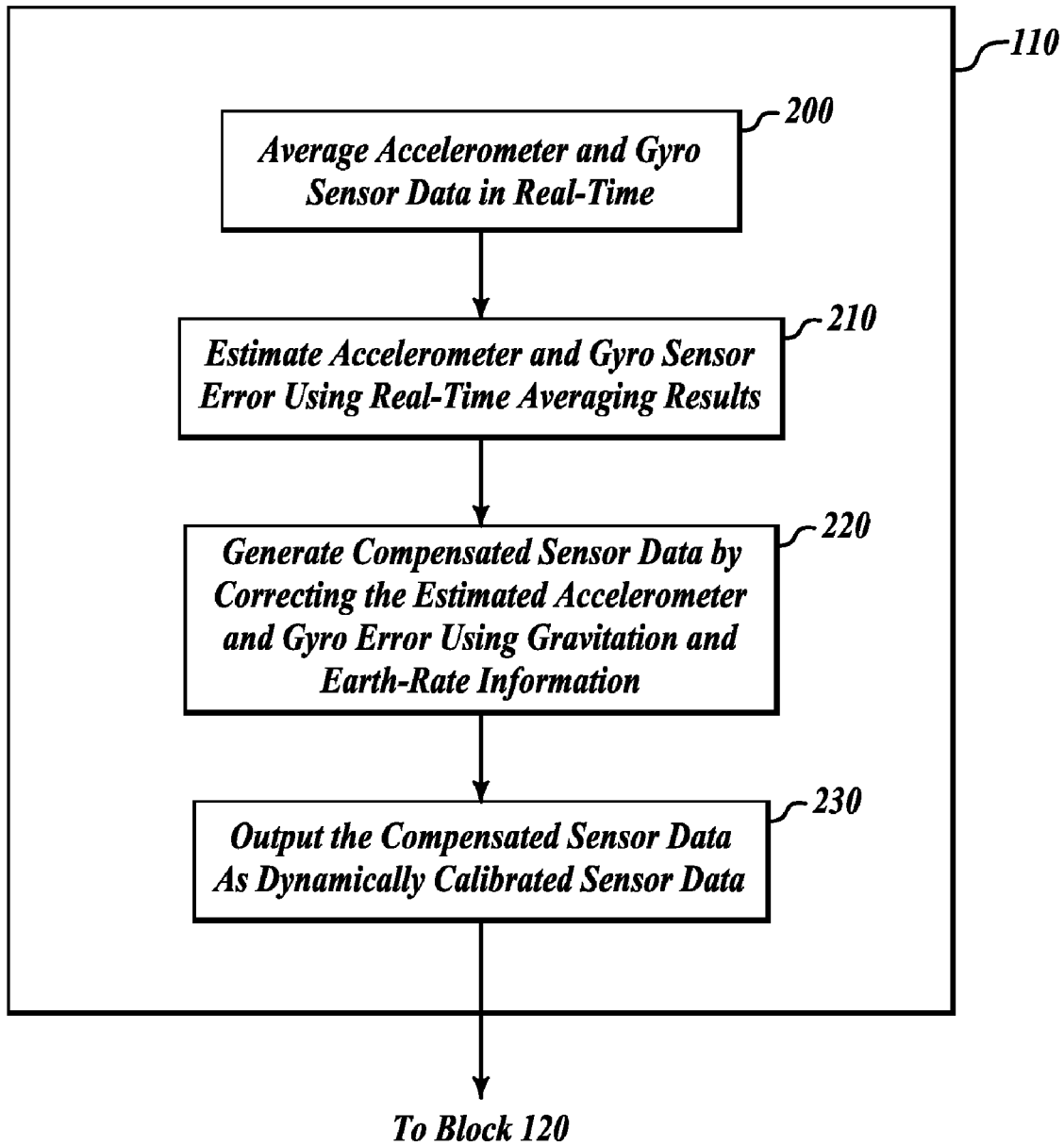

FIG. 3 is a flowchart showing additional detail for the block 110 shown in FIG. 2. First, at a block 200, accelerometer and gyro sensor data is averaged in real time to reduce noise in the information. In an example, the averaging is performed in two stages by the processing device 51. In a first stage, the data is averaged using a high data rate, such as 300 Hz, 600 Hz, or 1200 Hz, for a duration of approximately one second for example. In a second stage, the data is averaged over a longer alignment period that varies depending on the sensors used in the navigation system 50. The alignment period may range from approximately 30 seconds to approximately 300 seconds, for example. Next, at a block 210, gyro and accelerometer error is estimated by comparing the recorded sensor data with gravity and earth-rate values, such as those received from the gravitation input 68 and the earth-rate input 69, for example. Then, at a block 220, the estimated gyro and accelerometer error is corrected with known gravitation and earth rate values to generate compensated sensor data. For example, if the recorded sensor data was determined to be only 0.5 g for gravity, then the recorded data is multiplied by a compensation factor of 2 to generate a compensated gravity value. Next, at a block 230, the compensated sensor data is output as calibrated sensor data.

Figure 4:
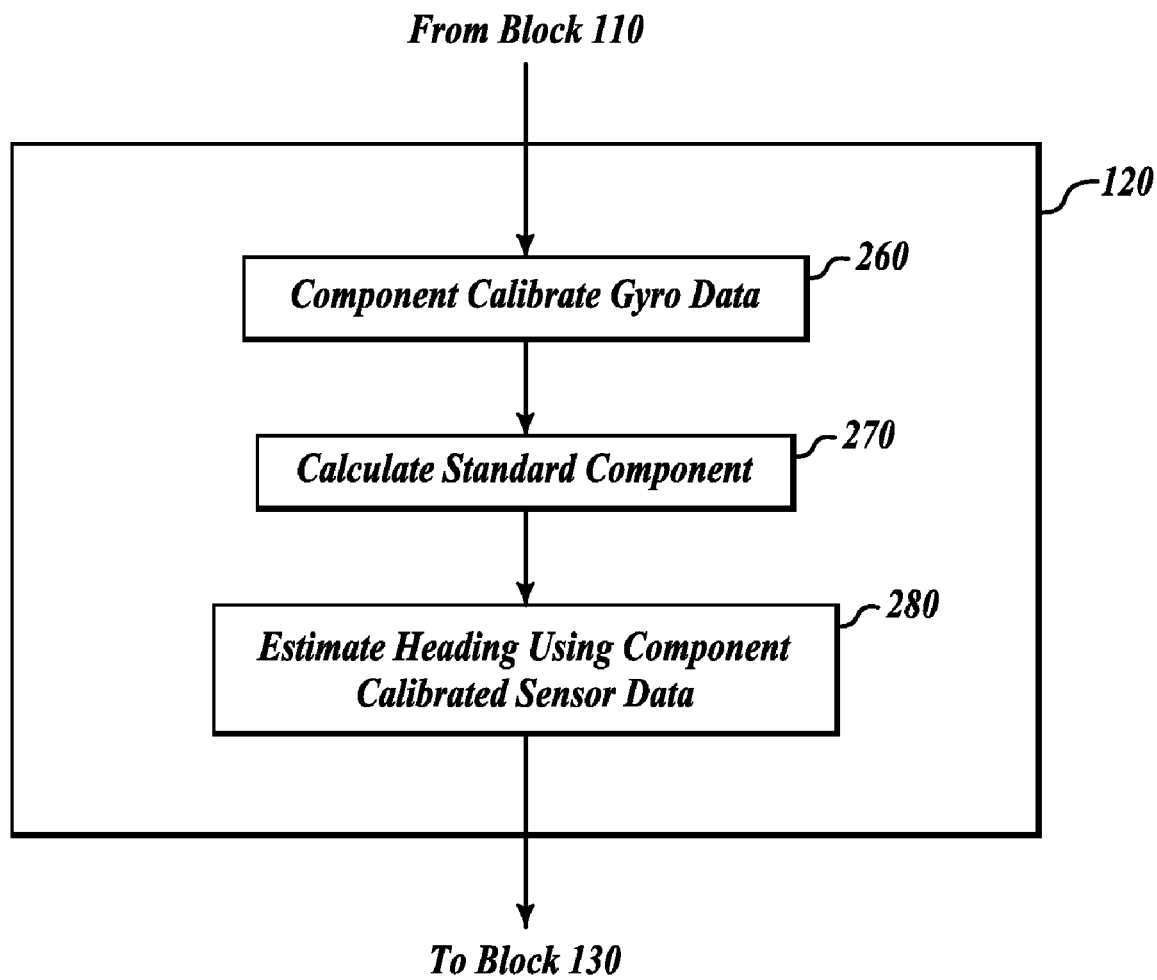

FIG. 4 is a flowchart showing additional detail for the block 120 shown in FIG. 2. First, at a block 260, a component calibration of gyro data is performed. Since earth rate and latitude are constant for a stationery case, the z component and the $\sqrt{x^2+y^2}$ component can be calibrated separately. Next, at a block 270, standard components are calculated using earth rate and latitude values. In one example, the standard components are calculated using the equation $\sqrt{x^2+y^2}$ and calibrated with earth rate*cos(latitude), where earth rate is the rate of rotation of the earth, and the z component is calibrated with earth rate*sin(latitude). For an ideal gyro sensor, the z component of the gyro value is earth-rate*sin(latitude). By comparing the z component from an actual gyro with earth-rate*sin(latitude), the "bias" or scale "factor" may be determined. Then, the real sensor data can be compensated to generate a more accurate value Next, at a block 280, heading is estimated using the component calibrated sensor data. In one example, the heading is estimated using the formula $$\alpha = \text{heading} = \sin^{-1}\left(\frac{W_y}{W_E} * \frac{1}{\cos(\lambda)}\right),$$

where $W_y$ is the y component of the measured earth-rate after the calibration, $W_E$ is the angular rate of rotation of the earth, and $\lambda$ is a latitude value at which the navigation system 50 is located.

Figure 5:
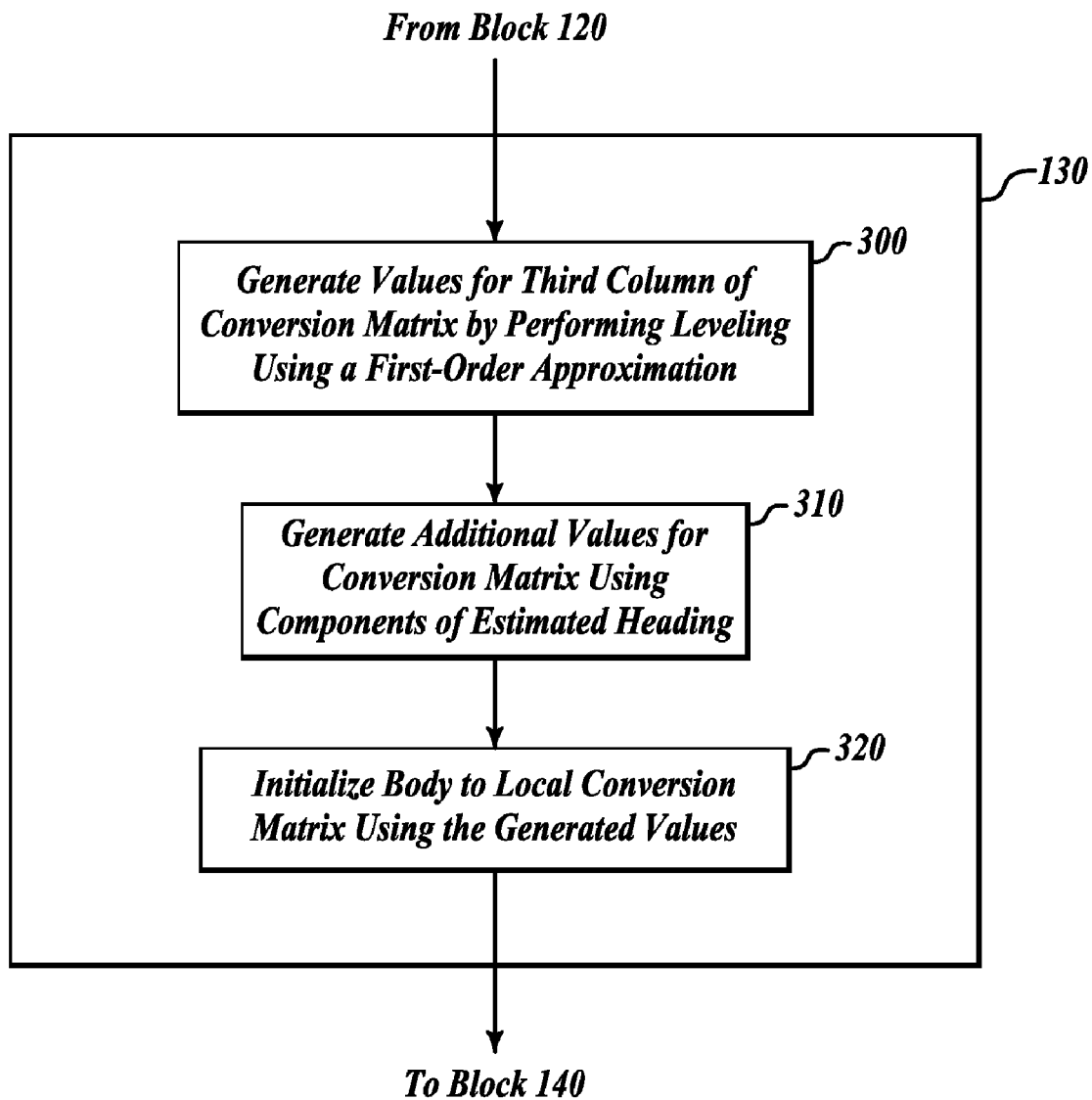

FIG. 5 is a flowchart showing additional detail for the block 130 shown in FIG. 2. First, at a block 300, leveling using a first order approximation is performed to determine the third column of the body to local conversion matrix. In an example, leveling is defined as the process of finding the angles of roll and pitch using accelerometer data from the inertial sensors 60 that is calibrated using gravity data from the gravitational input 68, while alignment is defined as the process of locating heading or yaw angle between body and local frames. In one example, the following equations are used in this step, where $\psi$ is a rotation vector:

$$C_{31} = -\psi_2 = \frac{a_x}{g} \tag{7}$$

$$C_{32} = \psi_1 = \frac{a_y}{g} \tag{8}$$

$$C_{33} = 1 \tag{9}$$

Next, at a block 310, heading components are used to determine additional values in the body to local conversion matrix. In one example, the following equations are used in this step:

$$C_{11} = \cos \psi_3 \tag{10}$$

$$C_{12} = -\sin \psi_3 \tag{11}$$

$$C_{21} = \sin \psi_3 \tag{13}$$

$$C_{22} = \cos \psi_3 \tag{14}$$

Then, at a block 320, the body to local conversion matrix is initialized. In one example, the following equation is used:

$$C_{B2L} = \begin{bmatrix} \cos\psi_3 & \sin\psi_3 & -\psi_2 \\ -\sin\psi_3 & \cos\psi_3 & \psi_1 \\ \psi_2\cos\psi_3 + \psi_1\sin\psi_3 & \psi_2\sin\psi_3 - \psi_1\cos\psi_3 & 1 \end{bmatrix} \quad (15)$$

After roll and pitch are determined with equations 7-9 and yaw (heading) is determined according to the procedure described with respect to FIG. 4, the conversion matrix is determined according to equations 7-15. In an example, an assumption of small leveling angles (roll and pitch angles) is used, which is a valid assumption for the stationary case.

While the preferred embodiment of the invention has been illustrated and described, as noted above, many changes can be made without departing from the spirit and scope of the invention. For example, rather than being received from a GPS device during gyrocompass alignment, position information such as latitude and longitude may be received from a positioning device that does not depend on the Global Positioning System, a pilot, or another user. Also, various combinations of the DCAL coarse mode ("real-time calibration") together with the inverse of the "trajectory generation engine", IEKF coarse mode, and IEKF fine mode may be used for gyro-compass alignment. The system and method may also be used to reduce gyro-compass alignment times for navigation systems using expensive IMUs in addition to those using inexpensive IMUs. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A navigation system for a mobile object comprising:
an inertial measurement device configured to provide a first set of sensor data relating to operation of the mobile object; and
a processing device configured to receive the first data set and to dynamically calibrate the received first data set by comparing values in the first data set to one or more known values while the mobile object is stationary; the processing device further configured to generate an initial heading estimate based on the dynamically calibrated first data set;
wherein dynamic calibration of the received first data set includes determining at least one of a bias or a scale factor error of the inertial measurement device;
wherein the processing device is further configured to generate a coarse gyrocompass alignment while the mobile object is stationary based on the initial heading estimate using a non-linear Kalman filter operated in a coarse-mode; the processing device further configured to generate a fine gyrocompass alignment while the mobile object is stationary based on the coarse gyrocompass alignment using the non-linear Kalman filter operated in a fine-mode.

2. The navigation system of claim 1, wherein the non-linear Kalman filter is operated in a global iterated extended Kalman filter mode.

3. The navigation system of claim 1, wherein the Kalman filter is configured to use a virtual time step for each iteration of the Kalman filter; wherein the virtual time step is shorter than the iteration time of the Kalman filter represented by the virtual time step.

4. The navigation system of claim 1, wherein the processing device is configured to real-time average the first set of sensor data.

5. The navigation system of claim 1, wherein the processing device is further configured to generate a gyrocompass alignment using the initial estimated heading while the mobile object is stationary using an iterated Kalman filter configured to use a virtual time step for each iteration of the Kalman filter.

6. The navigation system of claim 1, further comprising a positioning unit configured to provide a second set of data relating to position of the mobile object,
wherein the processing device is configured to update the initial heading estimate based on the dynamically calibrated first data set and the second set of data while the mobile object is moving using a Kalman filter.

7. The navigation system of claim 1, wherein the processing device is configured to dynamically calibrate the first data set by comparing values in the first data set with known gravitational acceleration and earth rate values to generate the dynamically calibrated first set of sensor data.

8. A method for gyrocompass alignment, the method comprising:
receiving sensor data from an inertial measurement device in a stationary mode;
dynamically calibrating at least a portion of the sensor data by comparing the received sensor data with one or more known values, wherein dynamically calibrating at least a portion of the sensor data includes determining at least one of a bias or a scale factor error of the inertial measurement device;
generating an initial heading estimate based on the dynamically calibrated sensor data;
generating gyrocompass alignment information in the stationary mode based on the initial heading estimate with a Kalman filter operated in a non-linear mode; and
displaying a navigation output based on the generated gyrocompass alignment information;
wherein generating gyrocompass alignment information with a Kalman filter operated in a non-linear mode further comprises using a virtual time step for each iteration of the Kalman filter; wherein the virtual time step is shorter than the iteration time of the Kalman filter represented by the virtual time step.

9. The method of claim 8, wherein generating gyrocompass alignment information includes: generating a coarse gyrocompass alignment in the stationary mode based on the initial heading estimate using a non-linear Kalman filter operated in a coarse-mode; and
generating a fine gyrocompass alignment in the stationary mode based on the coarse gyrocompass alignment using the non-linear Kalman filter operated in a fine-mode.

10. The method of claim 8, wherein generating gyrocompass alignment information in the stationary mode further includes generating gyrocompass alignment information with a Kalman filter operated in a global iterated extended Kalman filter mode.

11. The method of claim 8, wherein dynamically calibrating comprises processing the sensor data using real-time averaging to generate averaged sensor data with reduced noise.

12. The method of claim 8, wherein dynamically calibrating further comprises comparing the received sensor data with known gravitational acceleration and earth rate values.

13. The method of claim 8, further comprising:
receiving additional sensor data from a positioning unit; and generating navigation information in a non-stationary mode based on the gyrocompass alignment information and the additional sensor using a Kalman filter.

14. The navigation system of claim 7, wherein the processing device is configured to calibrate a z component of the first data set separately from x and y components of the first data set.

15. A method of gyrocompass alignment, the method comprising:
- receiving sensor data from an inertial measurement device in a stationary mode;
- dynamically calibrating at least a portion of the sensor data by comparing the received sensor data with one or more known values; wherein dynamically calibrating at least a portion of the sensor data includes determining at least one of a bias or a scale factor error of the inertial measurement device;
- generating an initial heading estimate based on the dynamically calibrated sensor data;
- generating a coarse gyrocompass alignment in the stationary mode based on the initial heading estimate using a non-linear Kalman filter operated in a coarse-mode; and
- generating a fine gyrocompass alignment in the stationary mode based on the coarse gyrocompass alignment using the non-linear Kalman filter operated in a fine-mode;
- wherein a virtual time step is used for each iteration of the non-linear Kalman filter in the coarse-mode and the fine-mode; the virtual time step being shorter than the iteration time of the Kalman filter represented by the virtual time step.

16. The method of claim 15, wherein the non-linear Kalman filter is a global iterated extended Kalman filter.

17. The method of claim 15, wherein dynamically calibrating further comprises comparing the received sensor data with known gravitational acceleration and earth rate values.

* * * * *